US010939532B2

(12) United States Patent
Somaraju

(10) Patent No.: US 10,939,532 B2
(45) Date of Patent: Mar. 2, 2021

(54) SECURE COMMISSIONING OF WIRELESS ENABLED LIGHTING DEVICES

(71) Applicant: TRIDONIC GMBH & CO KG, Dornbirn (AT)

(72) Inventor: Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 61 days.

(21) Appl. No.: 16/079,586

(22) PCT Filed: Jan. 30, 2017

(86) PCT No.: PCT/EP2017/051952
§ 371 (c)(1),
(2) Date: Aug. 24, 2018

(87) PCT Pub. No.: WO2017/153092
PCT Pub. Date: Sep. 14, 2017

(65) Prior Publication Data
US 2019/0059144 A1    Feb. 21, 2019

(30) Foreign Application Priority Data
Mar. 10, 2016   (EP) ..................................... 16159591

(51) Int. Cl.
*H05B 37/02* (2006.01)
*H04L 29/08* (2006.01)
(Continued)

(52) U.S. Cl.
CPC .......... *H05B 47/19* (2020.01); *H04L 12/2818* (2013.01); *H04L 41/0806* (2013.01);
(Continued)

(58) Field of Classification Search
CPC .... H05B 47/19; H04W 12/003; H04W 12/04; H04L 12/2818; H04L 41/0806; H04L 67/12; H04L 67/125; H04L 12/2807
See application file for complete search history.

(56) References Cited

U.S. PATENT DOCUMENTS

2011/0310621 A1* 12/2011 Van Der Stok .... H05B 37/0272
362/311.12
2015/0173154 A1   6/2015 Faulkner
(Continued)

FOREIGN PATENT DOCUMENTS

| GB | 2518469 |   | 3/2015 |              |
|----|---------|---|--------|--------------|
| GB | 2518469 | A * | 3/2015 | ............ H04W 12/04 |

OTHER PUBLICATIONS

European Search Report in priority application EP 16159591.3 dated Aug. 19, 2016.
(Continued)

*Primary Examiner* — Nicholas R Taylor
*Assistant Examiner* — Sanjoy Roy
(74) *Attorney, Agent, or Firm* — Andrus Intellectual Property Law

(57) ABSTRACT

The invention relates to the field of commissioning of infrastructure elements of a lighting network for connecting wireless enabled lighting devices in a secure manner to a wireless network using key information acquired via a cloud based service. A commissioning device comprises a first communication means for communicating with a server unit. The commissioning device obtains identification information from the infrastructure element to be commissioned and transmits the obtained identification information to a server unit which stores key information associated with identification information of the infrastructure element. The server unit retrieves the key information associated with the transmitted identification information and transmits the
(Continued)

retrieved key information to the commissioning device. The commissioning device uses the received key information for establishing a secure communication channel to the infrastructure element.

11 Claims, 3 Drawing Sheets

(51) Int. Cl.
    *H04L 12/28*     (2006.01)
    *H04W 12/04*     (2009.01)
    *H05B 47/19*     (2020.01)
    *H04L 12/24*     (2006.01)
    *H04W 12/00*     (2009.01)

(52) U.S. Cl.
    CPC ............ *H04L 67/12* (2013.01); *H04L 67/125* (2013.01); *H04W 12/003* (2019.01); *H04W 12/04* (2013.01); *H04L 12/2807* (2013.01)

(56) References Cited

U.S. PATENT DOCUMENTS

| | | | |
|---|---|---|---|
| 2016/0007429 A1* | 1/2016 | Eskonen | H05B 37/0227 315/297 |
| 2016/0197772 A1* | 7/2016 | Britt | H04W 12/001 370/254 |
| 2017/0171950 A1* | 6/2017 | Barna | H04W 4/70 |
| 2017/0187456 A1* | 6/2017 | Siessegger | H04B 10/1149 |
| 2018/0042091 A1* | 2/2018 | De Menezes | G06K 7/10297 |
| 2018/0255506 A1* | 9/2018 | Wang | H04B 17/318 |

OTHER PUBLICATIONS

PCT Search Report in parent application PCT/EP2017/051952 dated Mar. 29, 2017.

* cited by examiner

SECURE COMMISSIONING OF WIRELESS ENABLED LIGHTING DEVICES

CROSS REFERENCE TO RELATED APPLICATIONS

The present application is the U.S. national stage application of International Application PCT/EP2017/051952 filed Jan. 30, 2017, which international application was published on Sep. 14, 2017 as International Publication WO 2017/153092 A1. The International Application claims priority to European Patent Application 16159591.3 filed Mar. 10, 2016.

FIELD OF THE INVENTION

The invention is in the field of commissioning of building technology devices, particularly lighting devices. The invention relates to a method for connecting wireless enabled infrastructure elements of a lighting network in a secure manner to the lighting network using key information acquired via a cloud based service.

BACKGROUND OF THE INVENTION

Lighting systems, particularly in buildings or around buildings, can include a large number of elementary units such as lighting units, lighting control units, switches, dimming units, sensor units such as occupancy sensors, ballasts for driving lighting units, communication units such as interfaces to other building systems like HVAC, or fire alarm. The individual infrastructure elements of the lighting network are furnished with a communication capability and require extensive configuration in order to put the physically installed lighting system into service. The process of commissioning the lighting system may include basic tasks of identifying an installed infrastructure element (infrastructure device), determining a location of the identified infrastructure device and providing a network address to the identified infrastructure device. If the lighting system, which stands as an example for other building infrastructure systems, includes a large number of infrastructure devices as its elements, the process of commissioning is cumbersome, requires time and involves significant resources.

Commissioning includes the process of associating a physical position of an installed lighting device with a logical, for example a bus or network address thereof and is an essential step during setup of an intelligent lighting system, for example a light management system. The commissioning step typically requires electric, electronic and/or software expertise by staff personnel installing the lighting system. This makes the installation costly due to the needed staff qualification and the commissioning process is advantageously supported by the use of dedicated commissioning devices which enable the staff personnel to perform the necessary commissioning steps in an automated manner. Moreover the commissioning process is typically performed at a point in time for which the telecommunication infrastructure of the building including the lighting system might be incomplete. Finally, the commissioning process requires the exchange of key information for establishing secure communication channels between the infrastructure devices constituting the lighting system.

The process of commissioning becomes even more complex if the lighting system requires secure communication between its infrastructure devices. The commissioning process then requires providing key information for a secure exchange of information between the infrastructure devices constituting the lighting system. Key information is a short piece of information which serves to encode/decode or authenticate a message between one or more infrastructure devices, for example to confirm that a message comes from the stated emitter (authenticity) as well as that its message content has not been changed during transit (integrity). However, during commissioning of the lighting system the distribution of key information itself has to be managed such that the key information is not to be intercepted or manipulated.

Also, the infrastructure devices to be commissioned usually require being equipped with a communication component that is able to communicate with a commissioning device. The commissioning device typically uses wireless communication to communicate with each infrastructure device. The commissioning device can then be used to read or set an address for the infrastructure device and read or configure operating parameters. Moreover, the commissioning device can exchange key information with the infrastructure device and associate a position with the address of the infrastructure device.

The commissioning device can be a communication terminal, for example a smartphone, a tablet or a mobile computer running a commissioning application program.

The infrastructure device can be a wireless enabled luminary, a wireless enabled infrastructure device for driving a luminary (ballast) or for controlling one or more luminaries.

However, this type of commissioning requires a peer-to-peer communication between the commissioning device and each infrastructure device of the lighting network and also rises extra costs as the devices not only need to be provided with the communication component, but also with additional means to authenticate or authorize an owner of the infrastructure device in order allow commissioning of the infrastructure device to a secure lighting network. An authority of an owner of the infrastructure device still needs to be performed manually by providing the credentials of the owner in order to enable the infrastructure device to independently verify the authority of the owner.

The credentials may be for example a password, a password phrase, key information or some sort of shared secret in a cryptographic sense. Also a private key may be used according to the invention.

SUMMARY OF THE INVENTION

The invention aims at overcoming these problems and to allow an efficient and secure commissioning of lighting devices.

The technical problem is solved by the method for commissioning a lighting device as described herein.

The method for commissioning at least one infrastructure element of a lighting network with a commissioning device that comprises a first communication means for communicating with a server unit. The method comprises a step of the commissioning device obtaining identification information of the lighting infrastructure element and is characterized in that a remote server unit stores key information associated with identification information of the infrastructure element. The commissioning device transmits obtained identification information to the server unit. The server unit retrieves the key information associated with the transmitted identification information, and transmits the retrieved key information to the commissioning device. The commissioning device uses the received key information for authenticating the remote element and then establishing a secure channel to the infrastructure element.

By acquiring the identification information unambiguously identifying the infrastructure element of the lighting network to be commissioned and using the acquired identification information to acquire key information from the server unit, which is stored in a memory of the server unit associated with the identification information, an automated and simultaneously secure authentication of an owner of the infrastructure element is possible. For example an owner may be required to log into the server unit using an owner account and thus he is required to provide his personal credentials before being able to request key information of the infrastructure element which he identifies by providing its identification information. A large number of infrastructure elements can be commissioned without requiring a fully integrated communication network being already available, as long as a communication capability between the infrastructure element with commissioning device exists. An exchange of key information via a possibly insecure communication channel between the infrastructure element and the commissioning device is not required during the process of commissioning according the invention. Secure commissioning and efficient commissioning become possible simultaneously.

The method of a preferred embodiment includes the commissioning device receiving the identification information from the infrastructure element via a second communication means of the commissioning device.

In an advantageous embodiment the second communication means establishes an insecure communication channel with a third communication means of the infrastructure element. This has the advantage that any, in particular wireless channel can be used. This is of particular relevance when a building infrastructure is yet to be completed, while commissioning is performed.

Preferably the first and/or second communication means is configured to communicate via wireless communication, preferably via mobile wireless communication and/or cellular wireless communication and/or wireless local area network communication with the server unit and the infrastructure element respectively. Thus the commissioning can be performed even if the building network is not completed yet.

In a further embodiment, the commissioning device is connecting the infrastructure element to a wireless network using the received key information.

Preferably the commissioning device transmits the identification information to and receives the retrieved key information from the server unit directly or indirectly via a local server unit. The key information may be e.g. a password, a pre-shared key or a private key to authenticate commissioning device.

According to an embodiment, the infrastructure element comprises memory means storing key information unique to the infrastructure element.

Preferably a step of manufacturing the infrastructure element comprises storing the key information in the memory means of the infrastructure element, and also storing the key information associated with the identification information of the infrastructure element in a storage means of the server unit.

Advantageously the commissioning device logs in to the server unit using user account information for transmitting the identification information and receiving the retrieved key information. This allows that only approved personnel can receive the key information although communication with the infrastructure element is insecure.

The technical problem is solved by a commissioning device for commissioning an infrastructure element of a lighting network, the commissioning device comprising a first communication means for communicating with a server unit and a processing unit. The processing unit obtains identification information from the infrastructure element, the commissioning device is characterized in the first communication means being configured to transmit the obtained identification information to the server unit and to receive key information associated with the obtained identification information from the server unit. The processing unit is configured to control establishing a secure communication channel to the infrastructure element using the received key information.

Furthermore the technical problem is solved by a lighting commissioning system comprising at least one infrastructure element of a lighting network, at least one server unit and a commissioning device as discussed before.

The invention will be described in more detail with reference to the attached drawings.

DETAILED DESCRIPTION

In the following description of an embodiment the term "means" is used which denotes an entity implemented in hardware and/or software. The term "means" may be exchanged by the term "unit" without intending to change the meaning of the term.

Figure 1:
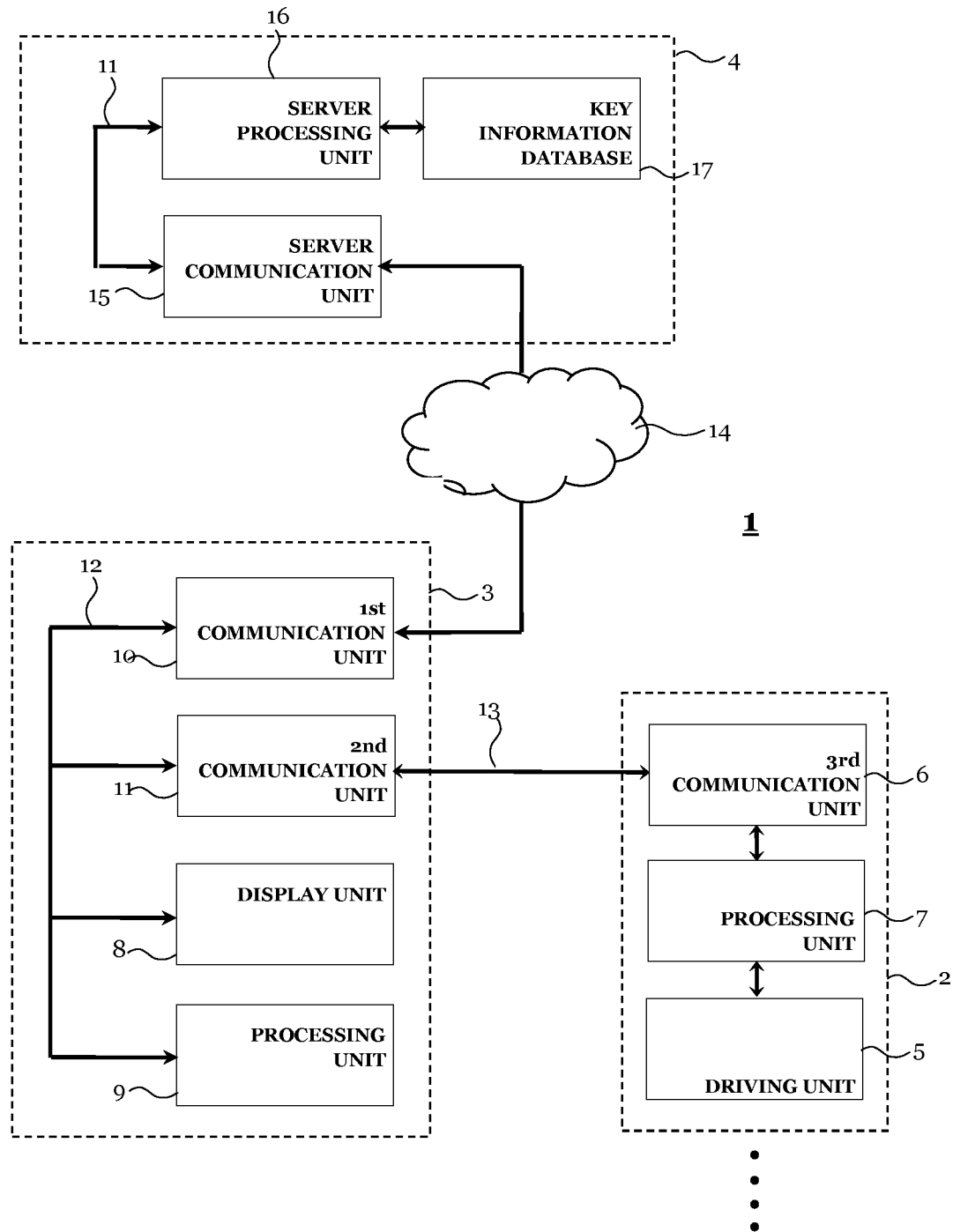
FIG. 1 illustrates a block diagram of an exemplary lighting system during commissioning, FIG. 2 provides a flowchart of an embodiment.

In FIG. 1 a lighting commissioning system 1 according to an embodiment is shown in a simplified manner which regards the interaction of the respective communication means during commissioning and the participating units during the commissioning process.

The lighting commissioning device 3 of the lighting commissioning system 1 includes a first communication means 10 and a second communication means 11.

The depicted ballast device 2 represents a single infrastructure element of the lighting network, which is of course not limited to including only one infrastructure element (infrastructure device). The lighting commissioning system 1 can comprise a large number of infrastructure devices in lighting network.

The infrastructure element is for example luminaire, a lighting unit, a ballast device 2 for driving light emitting means, an input means such as an On/Off switch, a dimming switch, any sensor such as a presence sensor, a fire alarm, any control means such as a central light control server or the like. In the following description of an embodiment the infrastructure element is represented by a ballast device 2.

The exemplary ballast device 2 includes a third communication means 6 and is adapted to operate in a lighting network 1.

The exemplary ballast device 2 shown in FIG. 1 comprises a driving means 5 for driving light emitting units not shown in FIG. 1. The driving means 5 provides a driving signal for driving at least one light emitting unit. The at least one light emitting unit preferably includes one or more light emitting diodes (LED, OLED) or gas discharge lamps for emitting light.

The third communication means 6 and the driving means 5 are connected via an internal communication means, for example a lighting bus system. The internal lighting bus system connects the ballast device 2 with the other units of the lightning system. The processing means 7 performs controlling of an operation of the ballast device 2, the operation including the standard function of driving the light emitting unit via the driving unit 5 as well as the process of commissioning the ballast device 2.

In particular the processing means 7 may be implemented in form of a microcontroller which performs the method steps for performing commissioning of the ballast device 2 according to the invention.

Furthermore, the processing means 7 is adapted to control the third communication means 6 and to transmit at least for a predetermined time a signal with identification information unique to the ballast device 2. The identification information is adapted to unambiguously identify the ballast device 2. The identification information can include a production serial number or similar unique identifier of the ballast device 2. The identification information can be transmitted by the third communication means 6 in a response signal to a request received via the third communication means 6, or can be transmitted regularly for a time interval at a predetermined time or even continuously.

The identification information may be assigned to the ballast device 2 during the process of manufacturing the ballast device 2 by the manufacturer. The identification information may be stored in a memory means of the processing means 7.

The processing means 7 may further be adapted to execute cryptographic processing using key information. The key information may be assigned to the ballast device 2 during a manufacturing process of the ballast device 2. The key information can be stored in a secure memory area of the processing means 7. The processing means 7 of a preferred embodiment is adapted to establish a secure communication channel via the third communication means 6 to at least one other ballast device 2 by performing cryptographic processing using the key information.

The third communication means 6 is preferably a wireless communication means which is configured to operate based on at least one communication standard suitable for a home automation network such as Bluetooth, Bluetooth LE, Bluetooth Smart, ZigBee, xAP, DSI, DALI, WLAN, a cellular mobile communication standard such as GSM, UMTS, LTE, CDMA or any other cellular communication standard of the $3^{rd}$, $4^{th}$ or even $5^{th}$ generation.

The third communication means 6 also enables communication with a communication counterpart such as commissioning device 3. The third communication means 6 may also be adapted to communicate by means of optical signals or acoustical signals. The third communication means 6 may also use visible light communication (VLC) for communication.

A commissioning device 3 as shown in FIG. 1 includes the first communication means 10, a second communication means 11, a display means 8 and commissioning processing means 9.

The commissioning device 3 advantageously is a mobile computing device, a smartphone or a tablet computer with a particular commissioning software program running on the processing means 9 of the mobile computing device.

The first communication means 10 of an embodiment is configured to communicate according to a communication protocol such as the internet protocol, for example IPv6, with one or more local and/or remote server units. In the exemplary embodiment shown in FIG. 1 the first communication means 10 enables the commissioning device 3 to communicate via a network 14, for example the internet, with a server unit 4.

The second communication means 11 is configured to enable communication with the third communication means 6 of the lighting device 2 as a communication counterpart. In a preferred embodiment, the second communication means 11 uses VLC communication. In FIG. 1 the second communication means 11 is shown to transmit and to receive communication signals to and from the third communication means 6.

The display means 8 of the commissioning device 3 may be a display of a mobile computing device. The display means 8 may also integrate the function of an input means when being implemented by a touch sensitive display of the mobile computing device. The commissioning software program is adapted to implement the functionalities required for commissioning the lighting system 1.

The server unit 4 shown in FIG. 1 is connected via network 14 with the commissioning device 3. The exemplary server unit 4 includes a server communication means 15, a server processing means 16 and storage means 17.

The server communication means 15 performs communication via the network 14 with other units such as other servers and in particular with the commissioning device 3. The server processing means 16 performs control processing of the server unit 14. In particular the server processing means 16 performs log-in processing for a user using a user account which may be accessible using the commissioning device 3. Furthermore, the server processing means 16 is adapted to access the storage means 17. The server processing means 16 processes requests for key information received via the server communication means 15, extracts identification information included in the request for key information and accesses the storage means 17 with the extracted identification information in order to retrieve the associated key information. The server processing unit 16 uses the retrieved key information associated with the received identification information to generate a response to the received request for key information. The response includes the retrieved key information and is transmitted via the server communication unit 15 over the network 14 to the commissioning device 3.

The storage unit 17 (also: key information database) is adapted to store identification information of a plurality of lighting devices 2 associated with their corresponding key information. The key information can be allocated during manufacturing of the ballast device 2 individually to each ballast device 2 and be stored in the storage means 17 associated with the identification information of the ballast device 2 to which the key information is allocated.

The server unit 4 may be implemented as cloud server of a manufacturer of ballast devices 2. An owner of the ballast device 2 can use a personal account to access the server unit 4 to retrieve the key information belonging to his owned ballast device 2.

Figure 2:
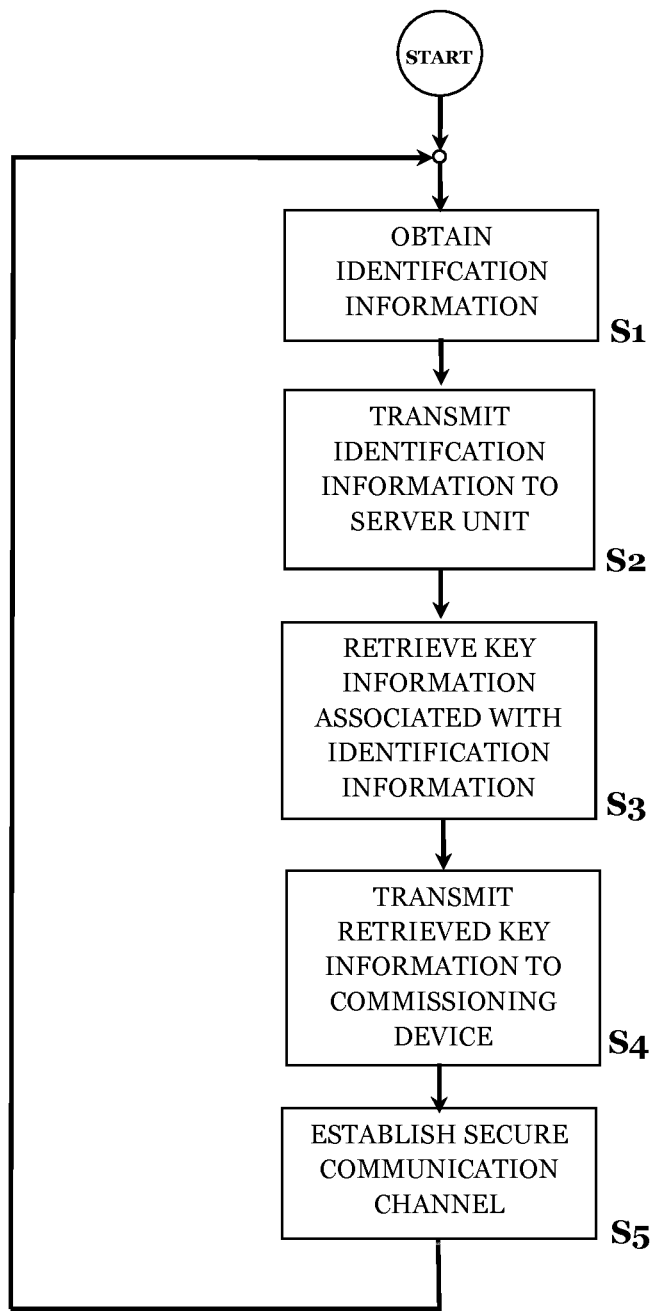

FIG. 2 shows a flowchart with the steps for executing the method according to the invention.

In a step S1 the commissioning device 3 obtains identification information from the ballast device 2. The commissioning device 3 may for example poll the ballast device 2 which has a wireless communication capability to disclose its respective identification information to the commissioning device 3. The commissioning device 3 of an embodiment may read the identification information from an optically readable tag or from a RFID tag attached to the ballast device 2.

In a subsequent step S2, the commissioning device 3 transmits the obtained identification information to the server unit 4. The commissioning device 4 may either transmit the identification information directly to the server unit 4 or via at least one local server unit being in direct communication with the commissioning device 3.

The server unit 4 receives the identification information, accesses the storage means 17 and retrieves key information which is stored in the storage means 17 in association with the received identification information.

In step S4, the server unit 4 transmits the retrieved key information to the commissioning device 3 over the network 14.

The commissioning device 3 is now, by using the received key information, enabled to establish a secure communication channel 13 to the ballast device 2. The commissioning device 3 may now make the ballast device 2 joining a secure lighting network. Performing the commissioning processing as described with respect to FIG. 2 enables an owner or user of the commissioning device 3 on one hand and the ballast device 2 on the other hand to authenticate each other by using the key information as a shared secret. During the processing neither the user of the commissioning device 3 nor the ballast device 2 are required to actually disclose the key information to each other. Thus even using an inherently unsecure communication channel 13 established between the second communication means 11 of the commissioning device 3 and the third communication means 6 of the ballast device 2 becomes possible during performing the commissioning process of the ballast device 2 without jeopardizing the integrity of the secure lighting network which may still be under construction.

Figure 3:
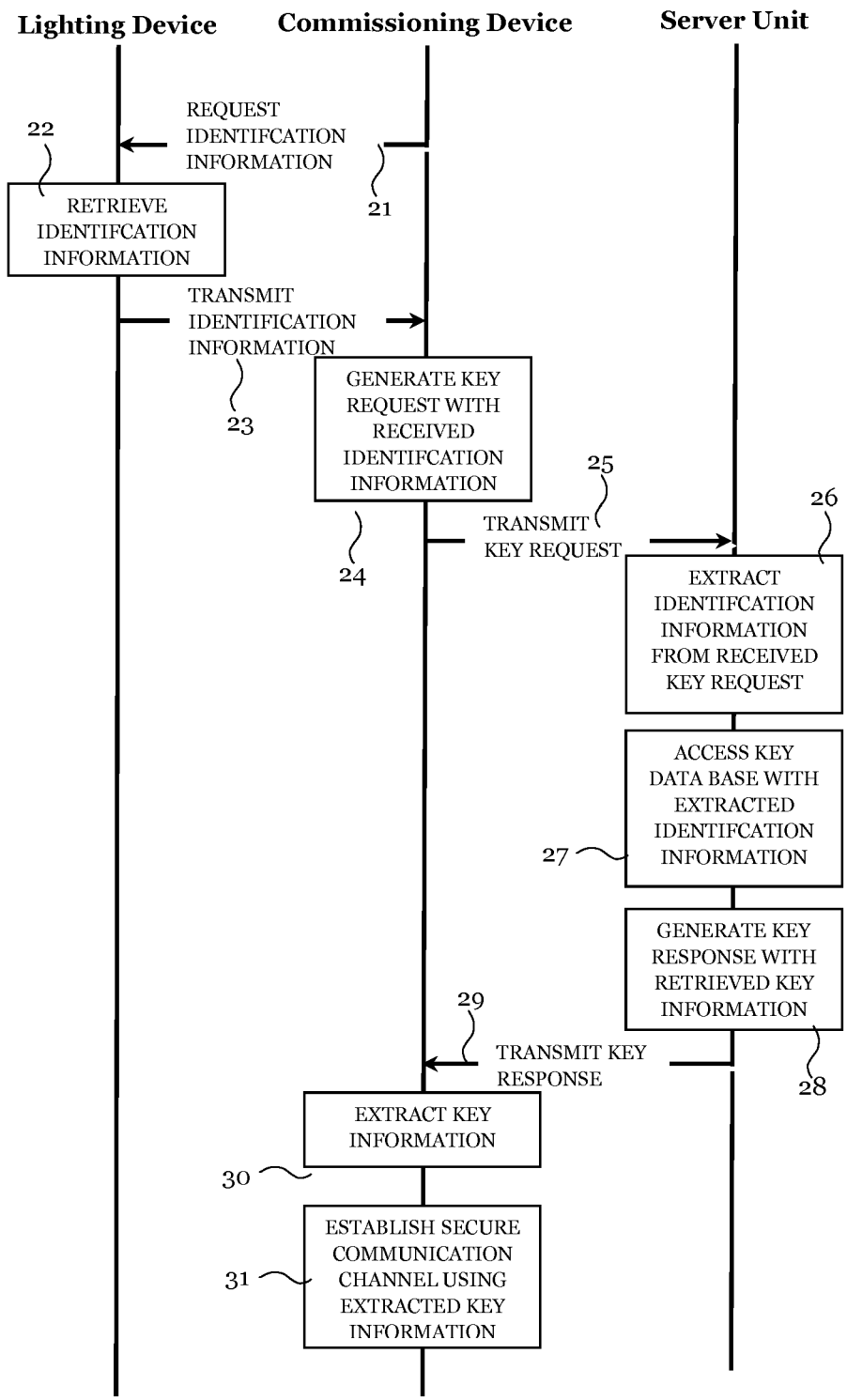
FIG. 3 depicts a processing sequence of an embodiment.

With reference to FIG. 3 an embodiment of the invention is discussed which shows the distribution of processing between the ballast device 2 and its processing unit 7, the commissioning device 3 and its processing unit 9 and the server unit 4 and its server processing means 16. For sake of simplicity it is assumed that the commissioning device 3 and the server unit 4 communicate directly over the network 14 with each other. The invention also has an embodiment in which the commissioning device 3 and the server unit 4 communicate indirectly, for example by relaying communication signals over a local server via the network 14 with each other.

Without departing from the invention it is assumed in FIG. 3 that a user of the commissioning device 3 has logged into a user account at the server unit 4, for example by providing an account name and a password or passphrase, or providing any other credentials of his identity. Thus the server unit 4 can regard the user and/or the commissioning device 3 controlled by the user to be an authorized commissioning device.

In FIG. 3, the commissioning device 3 transmits a request for identification information 21 to the ballast device 2. The ballast device 2 comprises the third communication means 6 being adapted to communicate for example wirelessly over a cellular phone network, for example according to a GSM-, UMTS-, LTE-, CDMA-standard, a 3G or 4G-cellular wireless standard. The ballast device 2 receives the request for identification information 21 and performs processing to retrieve the identification information 22 from a memory means of the ballast device 2. The ballast device 2 then transmits (returns) 23 the retrieved identification information to the commissioning device 3. The commissioning device 3 receives the identification information returned in response to the request for identification information 21. Then the commissioning device 3 performs processing for generating a key information request 24 including the received identification information of the ballast device 2. The key information request is then transmitted 25 to the server unit 4. The server unit 4 receives the transmitted key information request and performs extraction processing 26 for extracting the identification information from the received key information request. The server unit 4 then accesses the storage means 17 (key data base) and searches for and retrieves the key information which is stored in association with the identification information 27 which has been extracted from the received key information request. The retrieved key information which is associated with the unique identification information of the ballast device 2 forms an essential part of the key information response which is generated in the subsequent response signal generation processing 28 by the server unit 4. Then the server unit 4 transmits the generated key information response 29 to the commissioning device 3. The commissioning device 3 now performs extraction processing 30 for extracting the key information from the received key information response.

The commissioning device 3 can now use the extracted key information to establish a secure communication channel with the ballast device 2, for example to commission the ballast device 2 into a secure lighting network. The key information is now known both to the ballast device 2 as well as the commissioning device 3 and thus may serve as credentials that are used in a known authentication process for establishing the secure communication channel 13 between the ballast device 2 and the commissioning device 3.

The invention claimed is:

1. A method for commissioning at least one infrastructure element of a lighting network with a mobile commissioning device, wherein
    the mobile commissioning device comprises a first communication means for communicating with a server unit and a second communication means for communicating with the at least one infrastructure element, wherein said first communication means and said second communication means communicate outside the lighting network,
    the at least one infrastructure element comprises a memory means for storing pre-stored key information where the pre-stored key information is unique to the at least one infrastructure element, and the at least one infrastructure element comprises a third communication means,
    the server unit comprises storage means for also storing the pre-stored key information that is pre-stored on the infrastructure element and for associating the pre-stored key information with identification information of the at least one infrastructure element, and the method comprises the following steps:
    a) obtaining identification information using the commissioning device from the at least one infrastructure element;
    b) logging on to the server using the commissioning device via the first communication means and user account information in order to enable the transmission of the identification information to the server unit and the receiving of pre-stored key information retrieved from the server;

c) with the commissioning device logged on to the server, transmitting the obtained identification information from the commissioning device to the server unit via the first communication means;

d) using the server unit to retrieve the pre-stored key information associated with the transmitted identification information from the storage means, and transmitting the retrieved, pre-stored key information to the logged-on commissioning device via the first communication means;

e) using the received retrieved, pre-stored key information to automatically establish a secure communication channel between the second communication means on the commissioning device and the third communication means on the at least one infrastructure element; and f) commissioning the at least one infrastructure element to the light network over the secure communication channel between the second communication means on the commissioning device and the third communication means on the at least one infrastructure element, by associating a physical position of the at least one infrastructure element with a logical network address in the lighting network, configuring operating parameters of the at least one infrastructure element and providing key information for a secure communication between the at least one infrastructure element and the lighting network.

2. The method according to claim 1, wherein the commissioning device receives the identification information from the infrastructure element via the second communication means of the commissioning device.

3. The method according to claim 2, wherein the second communication means establishes an insecure communication channel with the third communication means of the infrastructure element when obtaining the identification information and prior to the retrieved, pre-stored key information being received by the commissioning device.

4. The method according to claim 1, characterized in that the first communication means is configured to communicate via wireless communication, wherein the wireless communication with the server unit is via mobile wireless communication or wireless local area communication with the server unit.

5. The method according to claim 1, characterized in that the commissioning device connects the infrastructure element to a wireless lighting network using the received, pre-stored key information.

6. The method according to claim 1, wherein the pre-stored key information in the memory means of the infrastructure element is stored during the manufacturing process of the infrastructure element by its manufacturer.

7. The method according to claim 1, characterized in that manufacturing of the infrastructure element comprises
    storing the pre-stored key information in the memory means of the infrastructure element, and
    also storing the pre-stored key information associated with the identification information of the infrastructure element in the storage means of the server unit.

8. The method according to claim 1 wherein the commissioning device receives the identification information for the respective infrastructure element by reading an optically readable tag.

9. The method according to claim 1 wherein the commissioning device receives the identification information for the respective infrastructure element by reading an RFID tag.

10. The method according to claim 1 wherein said method is used to commission multiple infrastructure elements to the lighting network, and the method comprises repeating steps a), c) through f) for each infrastructure element while the commissioning device remains logged into the server.

11. The method according to claim 1 wherein the first communication means on the commissioning device communicates with the server via the cloud.

* * * * *